United States Patent
Kamikado

(10) Patent No.: US 7,949,455 B2
(45) Date of Patent: May 24, 2011

(54) BRAKE CONTROL APPARATUS FOR VEHICLE AND BRAKE CONTROL METHOD FOR VEHICLE

(75) Inventor: Masaru Kamikado, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 839 days.

(21) Appl. No.: 11/976,064

(22) Filed: Oct. 19, 2007

(65) Prior Publication Data

US 2008/0103668 A1 May 1, 2008

(30) Foreign Application Priority Data

Oct. 26, 2006 (JP) ................................ 2006-291161

(51) Int. Cl.
*B60T 8/24* (2006.01)
(52) U.S. Cl. ............... 701/70; 701/72; 701/75; 303/146; 303/147
(58) Field of Classification Search ..................... 701/70, 701/72, 75; 303/146, 154, 167, 122, 9, 122.13, 303/3, 147
See application file for complete search history.

(56) References Cited

U.S. PATENT DOCUMENTS

| | | | | |
|---|---|---|---|---|
| 5,172,961 A | * | 12/1992 | Inoue et al. | 303/146 |
| 5,375,917 A | * | 12/1994 | Inagaki et al. | 303/154 |
| 6,572,202 B2 | * | 6/2003 | Watanabe | 303/167 |
| 7,367,633 B2 | * | 5/2008 | Craig et al. | 303/3 |
| 7,393,065 B2 | * | 7/2008 | Craig et al. | 303/122.09 |
| 2002/0109403 A1 | * | 8/2002 | Yamamoto et al. | 303/146 |

FOREIGN PATENT DOCUMENTS

JP          8-207823 A          8/1996

* cited by examiner

*Primary Examiner* — Thomas G Black
*Assistant Examiner* — Marthe Marc Coleman
(74) *Attorney, Agent, or Firm* — Buchanan Ingersoll & Rooney PC

(57) ABSTRACT

A brake control apparatus which is used in a vehicle having wheels on left and right sides, and controls a braking force provided to each wheel is disclosed. The brake control apparatus is provided with a vehicle body speed calculating section, a steering angle calculating section, and an ECU. A braking force is provided to a wheel on the inner side with respect to the vehicle turning direction in the case where the absolute value of the steering angle is equal to or greater than the preset threshold value of the steering angle. In the case where the vehicle body speed is less than the preset speed threshold value, the braking force becomes smaller than the braking force in the case where the vehicle body speed is equal to or greater than the speed threshold value.

10 Claims, 8 Drawing Sheets

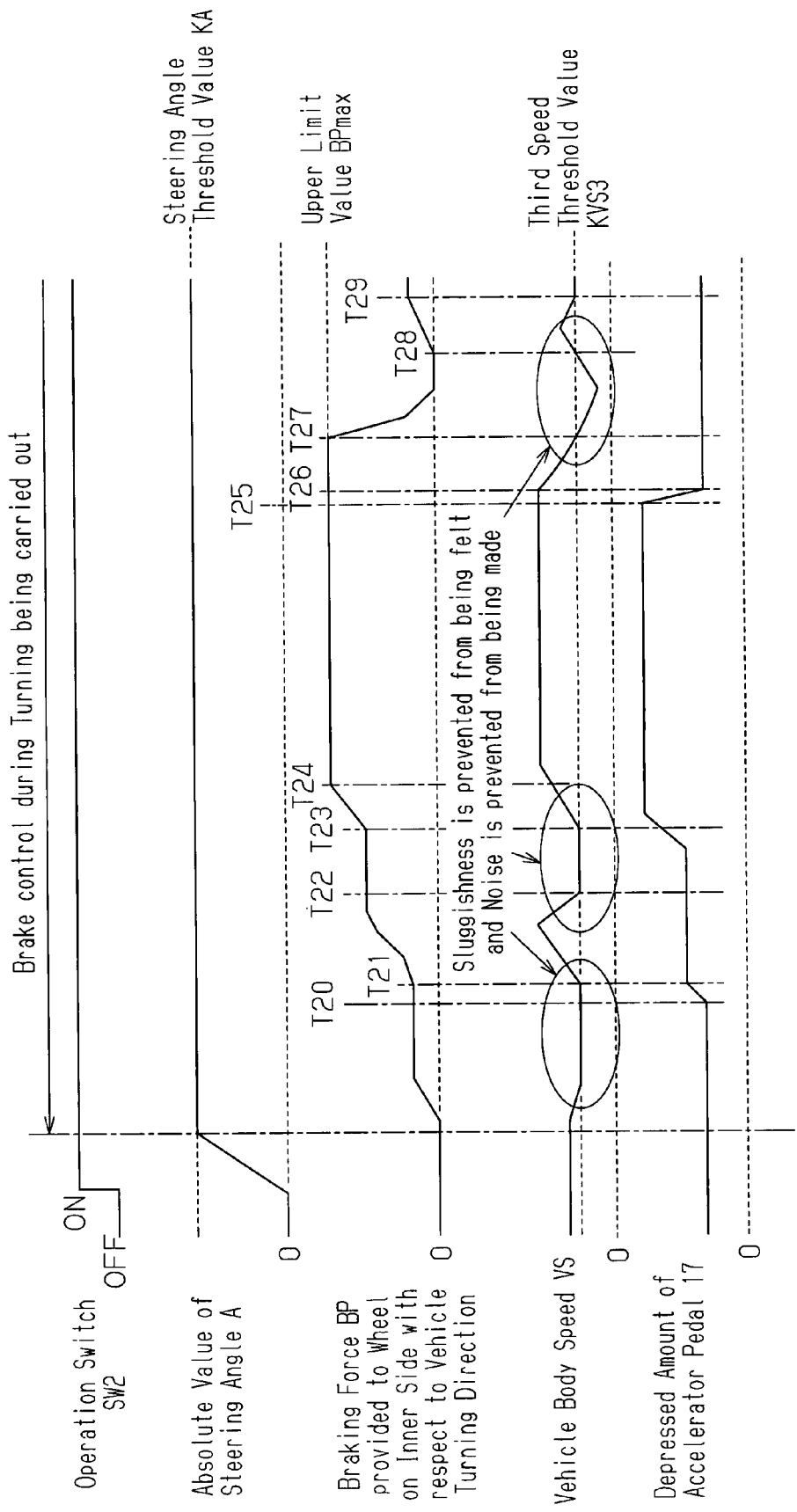

BRAKE CONTROL APPARATUS FOR VEHICLE AND BRAKE CONTROL METHOD FOR VEHICLE

CROSS REFERENCE TO RELATED APPLICATIONS

This application is based on and claims priority under 35 U.S.C. sctn. 119 with respect to Japanese Patent Application No. 2006-291161 filed on Oct. 26, 2006, the entire content of which is incorporated herein by reference.

BACKGROUND OF THE INVENTION

The present invention relates to an apparatus and a method for controlling a braking force provided to each wheel of a vehicle.

Brake control apparatuses have been known that execute brake control for reducing the turning radius when a vehicle such as a general automobile turns. The brake control apparatus disclosed in Japanese Laid-Open Patent Publication No. 8-207823 (hereinafter, referred to as a conventional apparatus), for example, obtains the steering angle of the steering wheel and determines that the steering wheel is in the maximum steering state in the case where the thus obtained steering angle is equal to or greater than a preset threshold value. In this case, this conventional apparatus executes brake control during turning (this is also referred to as small turn control) in order to provide a braking force to the rear wheel on the inner side relative to the direction in which the vehicle turns (for example, the right rear wheel in the case where the vehicle is turning to the right). The maximum steering state means a state where the steering wheel is steered in one turning direction (clockwise or counterclockwise) to the maximum.

The vehicles which carry out the small turn control in this manner turn with a turning movement around the rear wheel on the inner side relative to the direction in which the vehicle turns. Therefore, the turning radius of the vehicles which carry out the small turn control becomes smaller than that of the vehicles which do not carry out the small turn control. As a result, when a driver finds an obstacle in the direction in which the vehicle is traveling, and turns the steering wheel to the maximum, it is possible to avoid the obstacle appropriately by carrying out the small turn control.

In vehicles in which a conventional apparatus as described above is mounted, in the case where the steering wheel is turned to the maximum even in a state where the vehicle is not moving, a braking force is provided to the rear wheel on the inner side relative to the direction in which the vehicle turns by carrying out the small turn control. In the case where the accelerator pedal is depressed by the driver of the vehicle in this state, the vehicle turns in a state where a braking force is provided to the rear wheel on the inner side relative to the direction in which the vehicle turns. The magnitude of the braking force provided to the rear wheel on the inner side relative to the direction in which the vehicle turns is set assuming a state where the wheels of the vehicle are being driven.

In general, however, the coefficient of static friction is greater than the coefficient of dynamic friction, and this also applies to the brake pads for vehicles. Therefore, in the case where a vehicle in a stopped state starts running through the depressing process of the accelerator pedal by the driver while the small turn control is being carried out, the type of friction force provided to the brake pads is switched from the static friction force to the dynamic friction force, and thus, the braking force applied to the rear wheel on the inner side relative to the direction in which the vehicle turns is rapidly reduced. That is to say, the rotational speed of the rear wheel on the inner side relative to the direction in which the vehicle turns is rapidly increased. As a result, an increase in the acceleration in the direction in which the vehicle is traveling delays relative to the amount by which the driver depresses the accelerator pedal (or the pedal operation speed) when the small turn control is carried out immediately after the vehicle starts moving. This may cause acceleration to feel sluggish. Sluggishness refers to when the acceleration experienced by the driver is less than that intended by the driver.

In addition, in the case where the vehicle starts moving in a state where a braking force is provided to the rear wheel on the inner side relative to the direction in which the vehicle turns, noise may be made in the vicinity of the rear wheel on the inner side relative to the direction in which the vehicle turns. Switching of the friction force provided to the brake pads from the static friction force to the dynamic friction force is considered one of the causes of this noise.

As described above, when the brake control during turning is carried out on a vehicle in a stopped state and the vehicle starts moving, the driver may feel uncomfortable.

SUMMARY OF THE INVENTION

An objective of the present invention is to provide a brake control apparatus and a brake control method which reduce discomfort experienced by a driver when a vehicle starts moving in the case where brake control during turning is being carried out on the vehicle in a stopped state.

In order to achieve the above described objective, one aspect of the present invention provides a brake control apparatus, which is used in a vehicle having wheels on left and right sides, and controls a braking force provided to each of the wheels. The brake control apparatus comprises a vehicle body speed calculating section, a steering angle calculating section, and a control section. The vehicle body speed calculating section obtains a vehicle body speed of the vehicle. The steering angle calculating section obtains a steering angle of a steering wheel of the vehicle. The control section carries out brake control during turning. The brake control during turning is executed in order to provide a braking force to a wheel on the inner side with respect to a vehicle turning direction in the case where the absolute value of the steering angle is equal to or greater than a preset threshold value of the steering angle. In the case where the vehicle body speed is less than a preset speed threshold value, the control section carries out the brake control during turning such that the braking force provided to the wheel on the inner side with respect to the vehicle turning direction is smaller than the braking force in the case where the vehicle body speed is equal to or greater than the speed threshold value.

Another aspect of the present invention provides a brake control method which is used in a vehicle having wheels on left and right sides, and controls a braking force provided to each of the wheels. The method includes: obtaining a vehicle body speed of the vehicle; obtaining a steering angle of a steering wheel of the vehicle; and carrying out brake control during turning. The brake control during turning is executed in order to provide a braking force to a wheel on the inner side with respect to the vehicle turning direction in the case where the absolute value of the steering angle is equal to or greater than a preset threshold value of the steering angle. In the case where the vehicle body speed is less than a preset speed threshold value when the brake control during turning is carried out, the braking force provided to the wheel on the inner side with respect to the vehicle turning direction is made smaller than the braking force in the case where the vehicle body speed is equal to or greater than the speed threshold value.

Other aspects and advantages of the invention will become apparent from the following description, taking in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a timing chart in the case where the brake control during turning is carried out on a vehicle in which the brake control apparatus according to the second embodiment is mounted.

DETAILED DESCRIPTION OF THE PREFERRED EMBODIMENTS

In the following, a first embodiment according to the present invention is described in reference to FIGS. 1 to 6.

Figure 1:
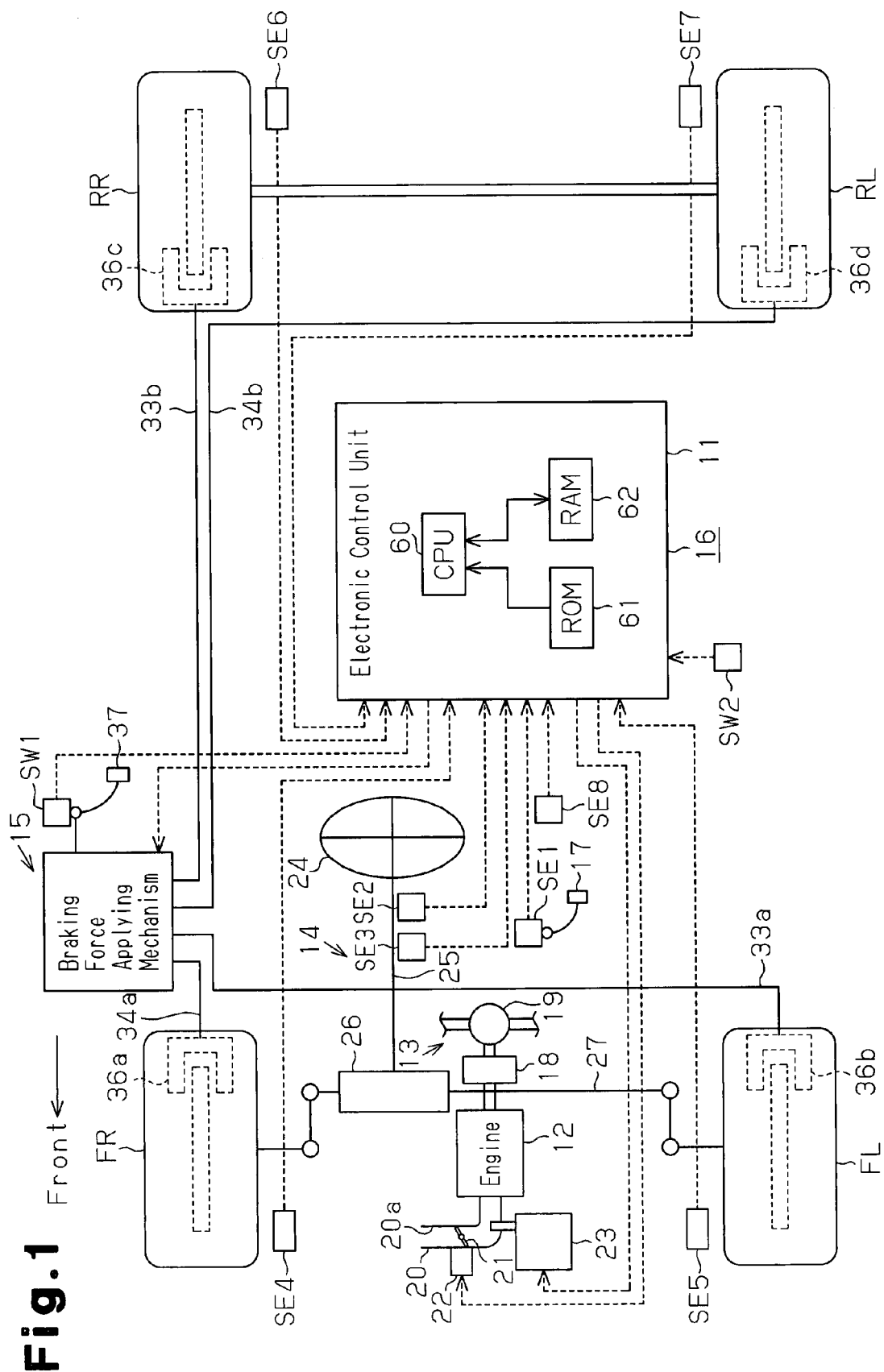
FIG. 1 is a block diagram showing a vehicle in which a brake control apparatus according to a first embodiment of the present invention is mounted.

As shown in FIG. 1, a vehicle in which a brake control apparatus 11 according to the present embodiment is mounted is provided with four wheels: a front right wheel FR, a front left wheel FL, a rear right wheel RR, and a rear left wheel RL. The vehicle is a front-wheel-drive vehicle where the front wheels FR and FL function as drive wheels. This vehicle is provided with an engine 12, which is a drive source, a power transmission mechanism 13, a front wheel steering mechanism 14, and a braking force applying mechanism 15. The power transmission mechanism 13 transmits the driving force generated in the engine 12 to the front wheels FR and FL. The front wheel steering mechanism 14 steers the front wheels FR and FL, which are wheels to be steered. The braking force applying mechanism 15 provides a braking force to each of the wheels FL, FR, RL, and RR. In addition, the vehicle is provided with an electronic control unit (hereinafter, referred to as "ECU") 16, which is a control section for appropriately controlling the respective mechanisms 13, 14 and 15 in accordance with the running state of the vehicle. The ECU 16 functions as the brake control apparatus 11. The engine 12 generates a driving force corresponding to the depressing operation of the accelerator pedal 17 by the driver of the vehicle.

The power transmission mechanism 13 includes a transmission 18, which is connected to the output shaft of the engine 12, and a differential gear 19 for front wheels FL, FR, which appropriately divides the driving force transmitted from the transmission 18 and transmits the divided driving force to the front wheels FL and FR. The transmission 18 is provided with a torque converter. An intake passage 20a within an intake pipe 20, which extends outward from the engine 12, is provided with a throttle valve 21 for changing the area of the cross section of its opening. A throttle valve actuator (for example, DC motor) 22 for controlling the degree of the opening of the throttle valve 21 is provided outside the intake pipe 20. In addition, a fuel injection device 23 having an injector for injecting fuel is provided in the vicinity of the intake port (not shown) of the engine 12. An accelerator pedal position sensor SE1 is provided in the vicinity of the accelerator pedal 17 in order to detect the amount by which the accelerator pedal 17 is depressed.

The front wheel steering mechanism 14 includes a steering wheel 24, a steering shaft 25, a steering actuator 26, a linking mechanism portion 27, a steering angle sensor SE2 and a steering torque sensor SE3. The steering wheel 24 is fixed to the steering shaft 25. The steering actuator 26 is linked to the steering shaft 25. The linking mechanism portion 27 has a tie rod which is movable in the left and right direction of the vehicle by means of the steering actuator 26, and a link for steering the front wheels FL and FR when the tie rod moves. The steering angle sensor SE2 detects the steering angle of the steering wheel 24. The steering torque sensor SE3 detects the steering torque applied to the steering wheel 24.

Figure 2:
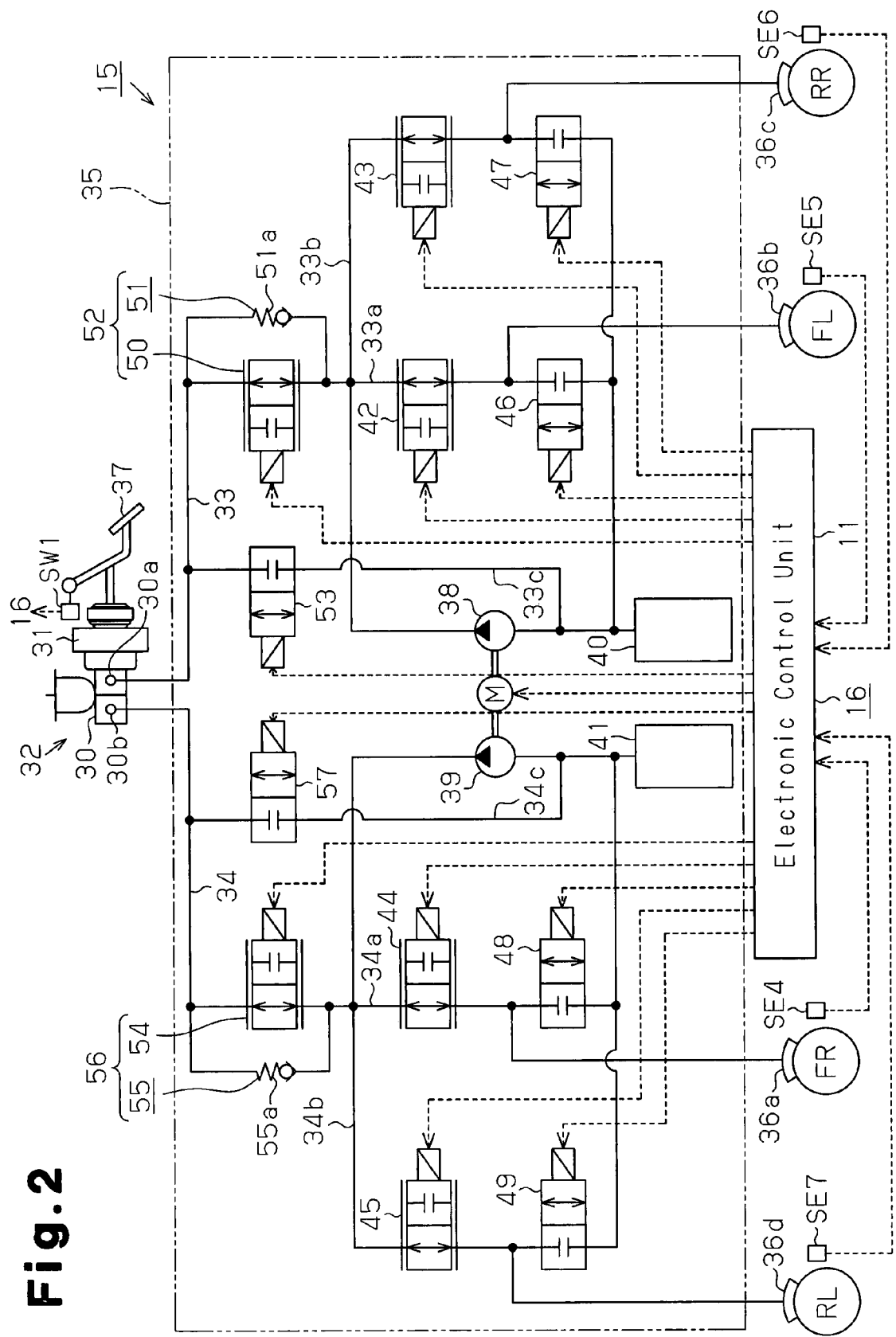
FIG. 2 is a block diagram showing the braking force applying mechanism of FIG. 1.

Next, the braking force applying mechanism 15 is described in reference to FIG. 2.

As shown in FIG. 2, the braking force applying mechanism 15 includes a hydraulic pressure generating device 32 and a hydraulic pressure controlling device (shown by two-dot chain line in FIG. 2) 35. The hydraulic pressure generating device 32 has a master cylinder 30 and a booster 31. The hydraulic pressure controlling device 35 has a first hydraulic pressure circuit 33 and a second hydraulic pressure circuit 34. The respective hydraulic pressure circuits 33 and 34 are connected to the hydraulic pressure generating device 32. The first hydraulic pressure circuit 33 is connected to a wheel cylinder 36b, which is provided so as to correspond to the front left wheel FL, and a wheel cylinder 36c, which is provided so as to correspond to the rear right wheel RR. The second hydraulic pressure circuit 34 is connected to a wheel cylinder 36a, which is provided so as to correspond to the front right wheel FR, and a wheel cylinder 36d, which is provided so as to correspond to the rear left wheel RL.

A brake pedal 37 is connected to the hydraulic pressure generating device 32. When the brake pedal 37 is depressed by the driver, the master cylinder 30 and the booster 31 of the hydraulic pressure generating device 32 are driven. The master cylinder 30 is provided with two output ports 30a and 30b. The first hydraulic pressure circuit 33 is connected to the first output port 30a, and the second hydraulic pressure circuit 34 is connected to the second output port 30b. The hydraulic pressure generating device 32 is provided with a brake switch SW1 electrically connected to the ECU 16, and the brake switch SW1 outputs a signal to the ECU 16 corresponding to the operating state of the brake pedal 37.

The hydraulic pressure controlling device 35 includes a first pump 38, a second pump 39, and a motor M. The first pump 38 increases the pressure of the brake fluid within the first hydraulic pressure circuit 33. The second pump 39 increases the pressure of the brake fluid within the second hydraulic pressure circuit 34. The motor M drives the two pumps 38 and 39 simultaneously. Respective reservoirs 40 and 41 for reserving the brake fluid are connected to the respective hydraulic pressure circuits 33 and 34. The brake fluid within the respective reservoirs 40 and 41 is supplied to the corresponding hydraulic pressure circuits 33 and 34 on the basis of the driving of the pumps 38 and 39.

The first hydraulic pressure circuit 33 has a path 33a for the front left wheel connected to the wheel cylinder 36b and a path 33b for the rear right wheel connected to the wheel cylinder 36c. The path 33a for the front left wheel is provided with a normally open type proportional electromagnetic valve 42 and a normally closed type electromagnetic valve 46. The path 33b for the rear right wheel is provided with a normally open type proportional electromagnetic valve 43 and a normally closed type electromagnetic valve 47.

In the same manner, the second hydraulic pressure circuit 34 has a path 34a for the front right wheel connected to the wheel cylinder 36a and a path 34b for the rear left wheel connected to the wheel cylinder 36d. The path 34a for the front right wheel is provided with a normally open type proportional electromagnetic valve 44 and a normally closed type electromagnetic valve 48. The path 34b for the rear left wheel is provided with a normally open type proportional electromagnetic valve 45 and a normally closed type electromagnetic valve 49.

A normally open type proportional electromagnetic valve 50 and a relief valve 51 are provided so as to have a parallel relationship in a portion of the first-hydraulic pressure circuit 33 between the master cylinder 30 and the branching point of the two paths 33a and 33b. The proportional electromagnetic valve 50 and the relief valve 51 form a proportional differential pressure valve 52. The proportional differential pressure valve 52 can generate a difference (difference in the pressure of the brake fluid) between the hydraulic pressure in a portion of the first hydraulic pressure circuit 33 between the master cylinder 30 and the proportional differential pressure valve 52 and the hydraulic pressure in a portion of the first hydraulic pressure circuit 33 between the wheel cylinders 36b and 36c and the proportional differential pressure valve 52 on the basis of the control by the ECU 16. The maximum value of the difference in the hydraulic pressure is determined by the pressing force of the spring 51a of the relief valve 51. In addition, a branched hydraulic pressure passage 33c extends from a portion of the first hydraulic pressure circuit 33 between the reservoir 40 and the first pump 38 to a portion of the first hydraulic pressure circuit 33 between the master cylinder 30 and the proportional differential pressure valve 52. A normally closed type electromagnetic valve 53 is provided in the branched hydraulic pressure passage 33c.

In the same manner, a normally open type proportional electromagnetic valve 54 and a relief valve 55 are provided so as to have a parallel relationship in a portion of the second hydraulic pressure circuit 34 between the master cylinder 30 and the branching point of the two paths 34a and 34b. The proportional electromagnetic valve 54 and the relief valve 55 form a proportional differential pressure valve 56. The proportional differential pressure valve 56 can generate a difference (difference in the pressure of the brake fluid) between the hydraulic pressure in a portion of the second hydraulic pressure circuit 34 between the master cylinder 30 and the proportional differential pressure valve 56 and the hydraulic pressure in a portion of the second hydraulic pressure circuit 34 between the wheel cylinders 36a and 36d and the proportional differential pressure valve 56 on the basis of the control by the ECU 16. The maximum value of the difference in the hydraulic pressure is determined by the pressing force of the spring 55a of the relief valve 55. In addition, a branched hydraulic pressure passage 34c extends from a portion of the second hydraulic pressure circuit 34 between the reservoir 41 and the second pump 39 to a portion of the second hydraulic pressure circuit 34 between the master cylinder 30 and the proportional differential pressure valve 56. A normally closed type electromagnetic valve 57 is provided in the branched hydraulic pressure passage 34c.

A change in the pressure of the brake fluid within the respective wheel cylinders 36a to 36d is described in the case where the solenoid coil in each of the electromagnetic valves 42 to 49 is in an energized state and in the case where they are in a non-energized state. In the following descriptions, the proportional electromagnetic valves 50 and 54 are both in an open state, and at the same time, the electromagnetic valves 53 and 57 in the branched hydraulic pressure passages 33c and 34c are in a closed state.

First, in the case where all the solenoid coils of the electromagnetic valves 42 to 49 are in a non-energized state, the normally open type proportional electromagnetic valves 42 to 45 are in an open state, and at the same time, the normally closed type electromagnetic valves 46 to 49 are in a closed state. Therefore, in the case where the pumps 38 and 39 are being driven, the brake fluid within the reservoirs 40 and 41 flows into the corresponding wheel cylinders 36a to 36d via the corresponding paths 33a, 33b, 34a and 34b, and thus, the pressure of the brake fluid within the respective wheel cylinders 36a to 36d increases.

Meanwhile, in the case where only the solenoid coils of the normally open type proportional electromagnetic valves 42 to 45 among the electromagnetic valves 42 to 49 are in an energized state, all the electromagnetic valves 42 to 49 are in a closed state. Therefore, the flow of the brake fluid via the respective paths 33a, 33b, 34a and 34b is restricted, and the pressure of the brake fluid within the respective wheel cylinders 36a to 36d is maintained.

In the case where all the solenoid coils of the electromagnetic valves 42 to 49 are in an energized state, the normally open type proportional electromagnetic valves 42 to 45 are in a closed state, and at the same time, the normally closed type electromagnetic valves 46 to 49 are in an open state. Therefore, the brake fluid within the respective wheel cylinders 36a to 36d flows out to the corresponding reservoirs 40 and 41 via the corresponding paths 33a, 33b, 34a and 34b, and thus, the pressure of the brake fluid within the respective wheel cylinders 36a to 36d is lowered.

As shown in FIG. 1, the ECU 16 includes a digital computer having a CPU 60, a ROM 61 and a RAM 62, and a drive circuit (not shown) for driving the respective devices. The ROM 61 stores various types of control programs and various types of threshold values for controlling the power transmission mechanism 13, the front wheel steering mechanism 14, and the braking force applying mechanism 15 (hydraulic pressure controlling device 35). The various types of threshold values include the below described first speed threshold value KVS1, steering angle threshold value KA, and second speed threshold value KVS2. In addition, the RAM 62 stores various types of information which is appropriately overwritten during driving of the vehicle.

In addition, the brake switch SW1, the accelerator pedal position sensor SE1, the steering angle sensor SE2, the steering torque sensor SE3, and wheel speed sensors SE4, SE5, SE6 and SE7 are connected to the input interface (not shown) of the ECU 16. The respective wheel speed sensors SE4, SE5, SE6 and SE7 detect the rotational speed of the corresponding wheels FR, FL, RR and RL. Furthermore, a vehicle body acceleration sensor (G sensor) SE8 for detecting the acceleration of the vehicle body in the front and rear direction of the vehicle and an operation switch SW2, which is set to "ON" in the case where the below described brake control during turning is carried out, are connected to the input interface.

The ECU 16 obtains the steering angle of the steering wheel 24 on the basis of the signal from the steering angle sensor SE2. The ECU 16 obtains the steering angle as a positive value on the basis of the signal from the steering angle sensor SE2 in the case where the steering wheel 24 is turned clockwise, and obtains the steering angle as a negative value on the basis of the signal from the steering angle sensor SE2 in the case where the steering wheel 24 is turned counterclockwise. The ECU 16 obtains the acceleration of the vehicle body as a positive value on the basis of the signal from the vehicle body acceleration sensor SE8 when the vehicle moves forward, and obtains the acceleration of the vehicle body as a negative value on the basis of the signal from the vehicle body acceleration sensor SE8 when the vehicle moves backward.

Meanwhile, the motor M for driving the two pumps 38 and 39, as well as the electromagnetic valves 42 to 50, 53, 54 and 57 are connected to the output interface (not shown) of the ECU 16. The ECU 16 controls the individual operations of the motor M and the electromagnetic valves 42 to 50, 53, 54 and 57 on the basis of the input signals from the brake switch SW1 and the various types of sensors SE1 to SE8.

Figure 3:
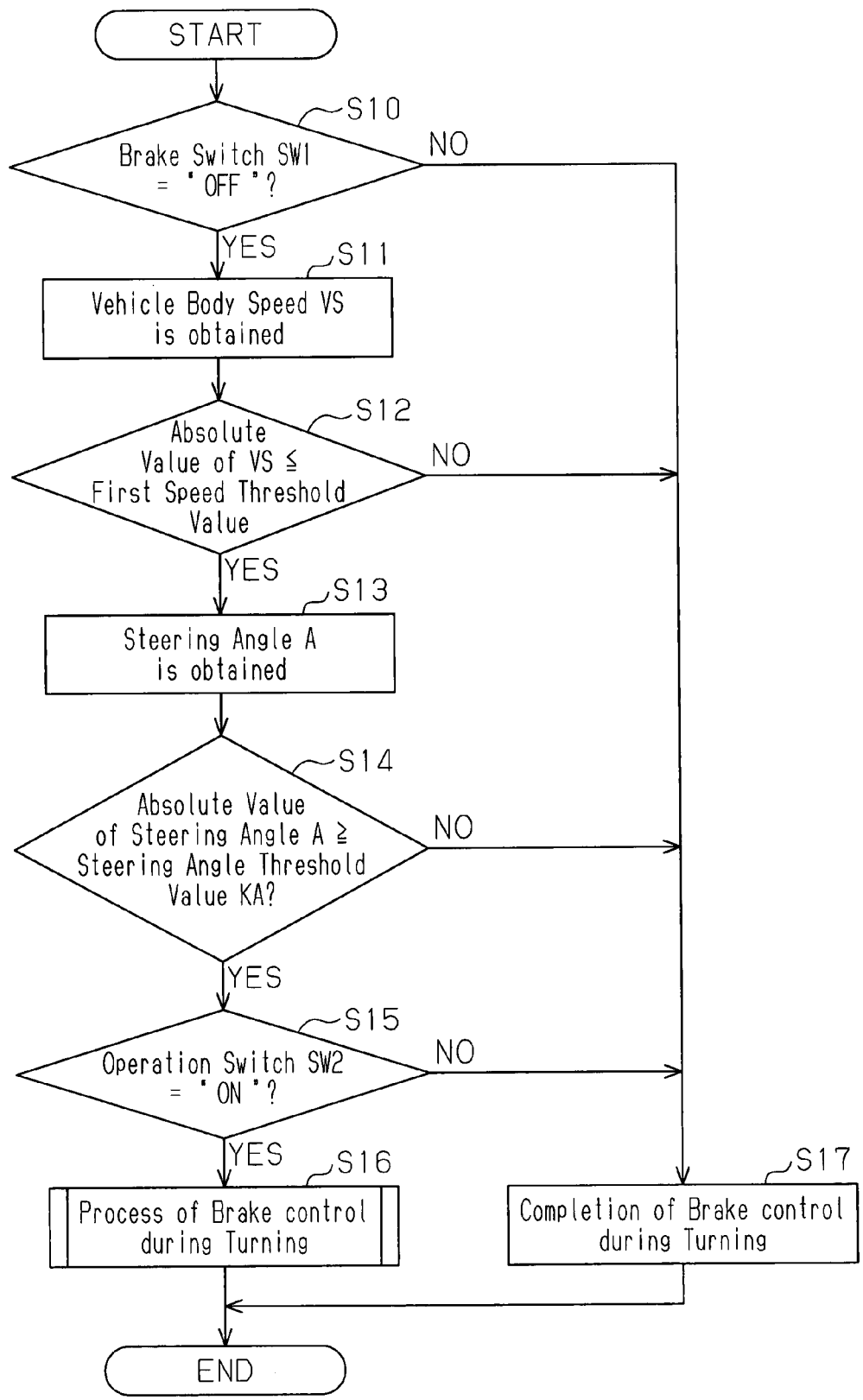
FIG. 3 is a flowchart showing a determination process routine according to the first embodiment.
Figure 4:
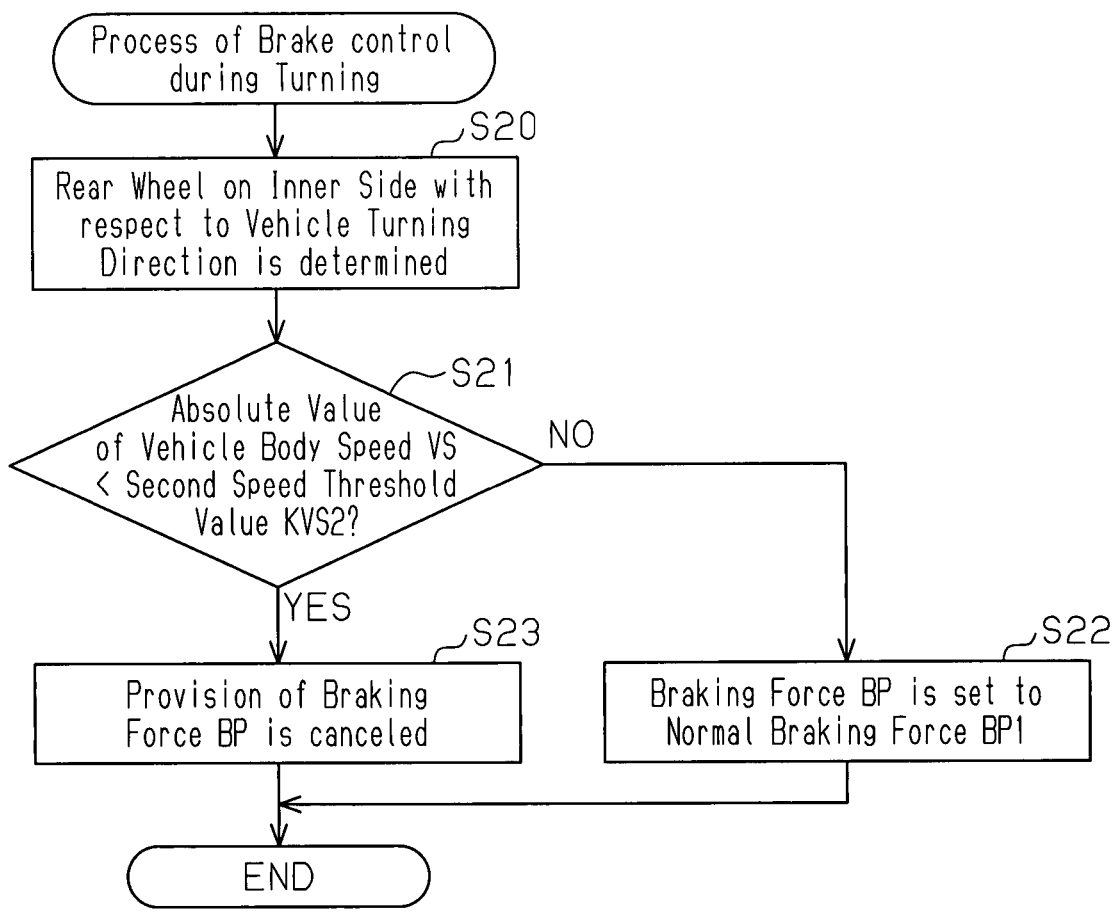
FIG. 4 is a flowchart showing the process routine of brake control during turning in step S16 of FIG. 3.
Figure 5:
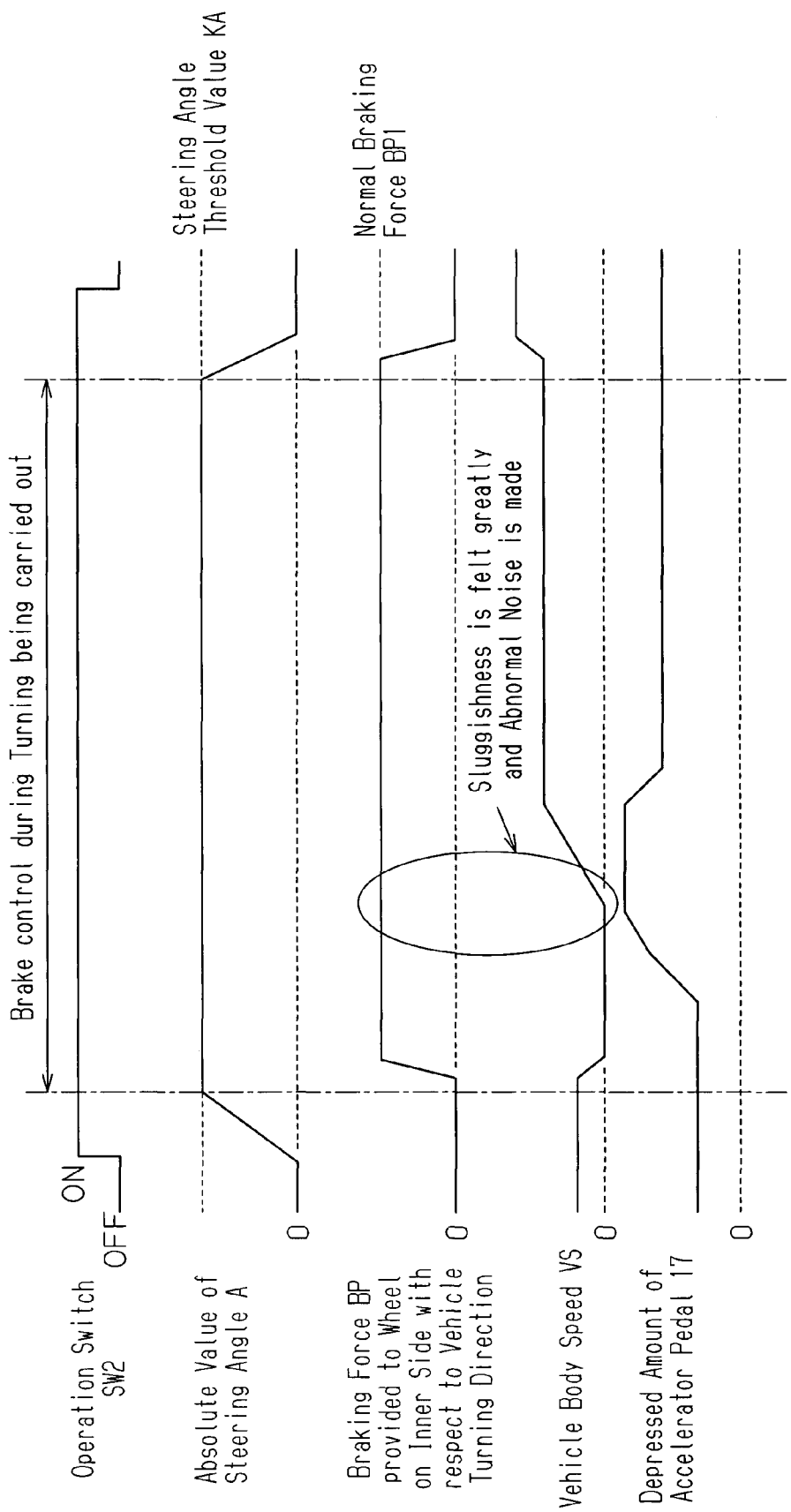
FIG. 5 is a timing chart in the case where the brake control during turning is carried out on a vehicle in which a conventional brake control apparatus is mounted.
Figure 6:
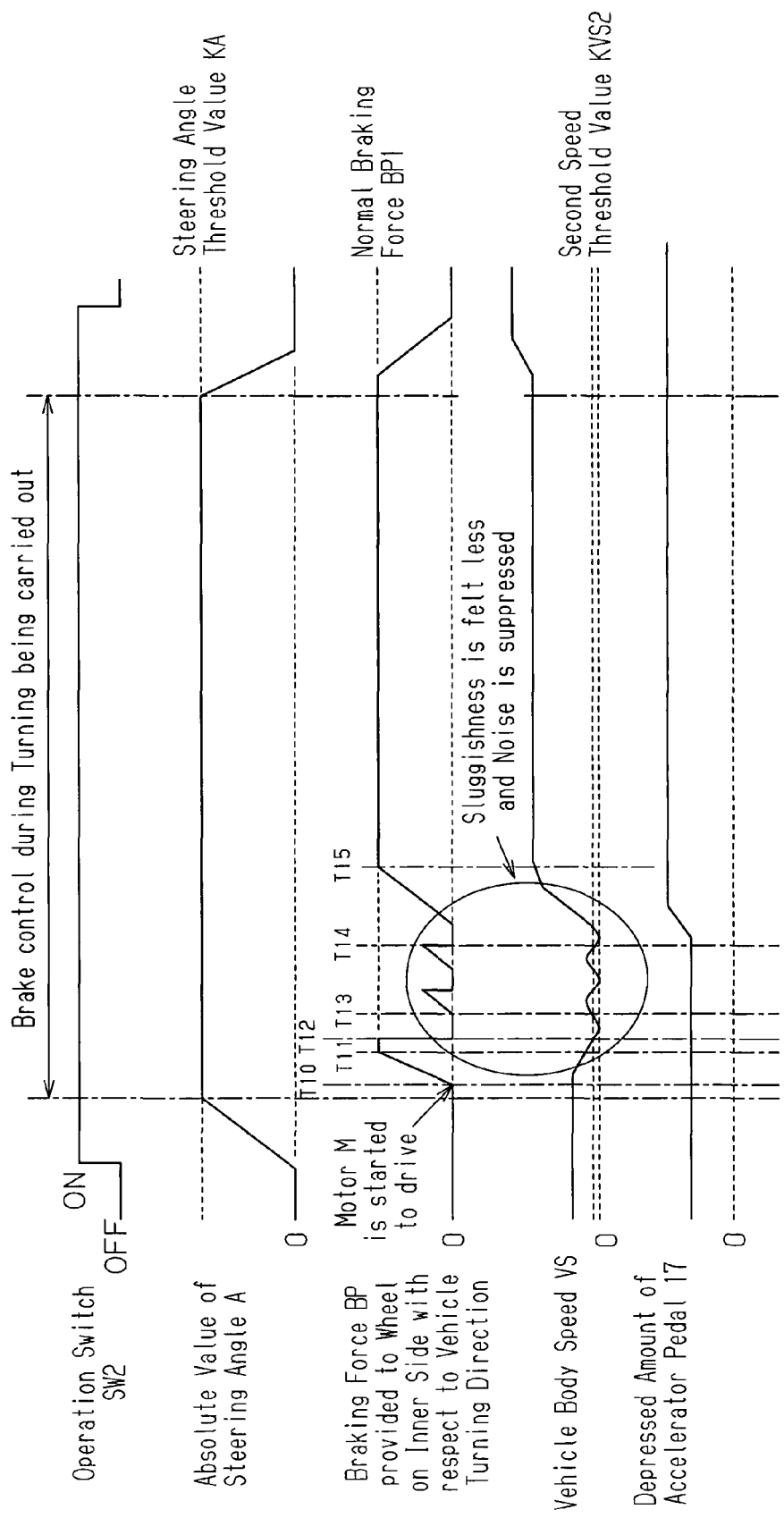
FIG. 6 is a timing chart in the case where the brake control during turning is carried out on a vehicle in which the brake control apparatus according to the first embodiment is mounted.

Next, the brake control during turning carried out by the ECU 16 is described in reference to the flowcharts shown in FIGS. 3 and 4 and the timing charts shown in FIGS. 5 and 6. The timing chart shown in FIG. 5 is a timing chart related to a vehicle in which a conventional brake control apparatus is mounted. The timing chart shown in FIG. 6 is a timing chart related to a vehicle in which the brake control apparatus 11 according to the present embodiment is mounted.

The ECU 16 carries out the determination processing routine shown in FIG. 3 at a predetermined interval (for example, every 0.01 seconds). In the determination processing routine, whether the brake control during turning should be carried out is determined. First, in step S10, the ECU 16 determines whether the input signal from the brake switch SW1 is "OFF." That is to say, the ECU 16 determines whether the brake pedal 37 is not depressed. In the case where the result of the determination in step S10 is a negative determination (SW1="ON"), the ECU 16 shifts the process to the following step S17.

Meanwhile, in the case where the result of the determination in step S10 is an affirmative determination (SW1="OFF"), the ECU 16 obtains the vehicle body speed VS on the basis of the input signals from the wheel speed sensors SE4 to SE7 in step S11. Concretely, the ECU 16 obtains the respective rotational speeds of the front wheels FR and FL on the basis of the input signals from the wheel speed sensors SE4 and SE5 corresponding to the front wheels FR and FL, which are drive wheels, and obtains the vehicle body speed VS on the basis of the greater value between the rotational speeds of the front wheels FR and FL. In this respect, the ECU 16 functions as a vehicle body speed calculating section according to the present embodiment.

In the subsequent step S12, the ECU 16 determines whether the absolute value of the vehicle body speed VS detected in step S11 is less than or equal to the preset first speed threshold value KVS1 (for example, 10 km per hour). The first speed threshold value KVS1 is a limit value (upper limit value) of the vehicle body speed with which the below described effects of the brake control during turning can be properly gained and is preset through experiments and simulations. The first speed threshold value KVS1 is set to a value slightly greater than the vehicle body speed in the case where the vehicle runs due to a creep phenomenon that is specific to vehicles having a torque converter. A creep phenomenon means that the driving force of the engine 12 corresponding to the rotational speed of the engine 12 at the time of idling is transmitted to the front wheels FR and FL via the crank shaft and the differential gear 19 for the front wheels, and the vehicle runs at approximately 5 km per hour.

In the case where the result of the determination in step S12 is a negative determination (absolute value of VS>KVS1), the ECU 16 shifts the process to the below described step S17. Meanwhile, in the case where the result of the determination in step S12 is an affirmative determination (absolute value of VS≦KVS1), the ECU 16 obtains the steering angle A of the steering wheel 24 on the basis of the input signal from the steering angle sensor SE2 in step S13. In this respect, the ECU 16 functions as a steering angle calculating section according to the present embodiment.

Subsequently, in step S14, the ECU 16 determines whether the absolute value of the steering angle A detected in step S13 is greater than or equal to the preset steering angle threshold value KA. The steering angle threshold value KA is set to the absolute value of the maximum steering angle of the steering wheel 24. The maximum steering angle means the steering angle when the steering wheel 24 is turned to the maximum in one rotational direction (clockwise or counterclockwise).

In the case where the result of the determination in step S14 is a negative determination (absolute value of A<KA), the ECU 16 shifts the process to the below described step S17. Meanwhile, in the case where the result of the determination in step S14 is an affirmative determination (absolute value of A≧KA), the ECU 16 determines whether the operation switch SW2 is set to "ON" in step S15. In the case where the result of the determination in step S15 is a negative determination (SW2="OFF"), the ECU 16 shifts the process to the below described step S17.

Meanwhile, in the case where the result of the determination in step S15 is an affirmative determination (SW2=ON), the ECU 16 carries out a process for brake control during turning in order to reduce the turning radius of the vehicle (that is to say, to have the vehicle make a smaller turn) in step S16. After that, the ECU 16 ends the present routine. That is to say, the brake control during turning (control for small turns) is carried out in the case where, as shown in FIGS. 5 and 6, the absolute value of the vehicle body speed VS is less than or equal to the first speed threshold value KVS1 and the absolute value of the steering angle A of the steering wheel 24 is greater than or equal to the steering angle threshold value KA, and in addition, the operation switch SW2 is "ON."

In step S17, the ECU 16 ends the braking operation during turning in the case where a negative determination is made in any one determination process from among the respective determination processes in steps S10, S12, S14 and S15. After that, the ECU 16 ends the present routine. That is to say, as shown in FIGS. 5 and 6, the brake control during turning is stopped in the case where the absolute value of the steering angle A of the steering wheel 24 is less than the steering angle threshold value KA even when the vehicle body speed VS is less than or equal to the absolute value of the first speed threshold value KVS1 and the operation switch SW2 is "ON."

Next, the process for brake control during turning in step S16 is described in reference to the flowchart shown in FIG. 4 and the timing chart shown in FIGS. 5 and 6.

In step S20 of FIG. 4, the ECU 16 determines which of the rear wheels RR and RL is on the inner side with respect to the vehicle turning direction. Concretely, the ECU 16 determines that the rear right wheel RR is on the inner side with respect to the vehicle turning direction in the case where the steering angle A obtained in step S13 of FIG. 3 is a positive value, and also determines that the rear left wheel RL is on the inner side with respect to the vehicle turning direction in the case where the obtained steering angle A is a negative value.

Next, in step S21, the ECU 16 determines whether the absolute value of the vehicle body speed VS obtained in the step S11 of FIG. 3 is less than the second speed threshold value KVS2. The second speed threshold value KVS2 is set to a value smaller than the first speed threshold value KVS1 and is, for example, 0.5 km per hour. The second speed threshold value KVS2 is a value for determining whether the braking force provided to the rear wheel on the inner side with respect to the vehicle turning direction is reduced in comparison with the case where the absolute value of the vehicle body speed VS is greater than or equal to the second speed threshold value KVS2. The second speed threshold value KVS2 is set to a value sufficiently smaller than the vehicle body speed in the case where the vehicle runs due to a creep phenomenon through experiments, simulations or the like.

In the case where the result of the determination in step S21 is a negative determination (absolute value of VS≧KVS2), the ECU 16 sets the braking force BP applied to the rear wheel on the inner side with respect to the vehicle turning direction to the normal braking force BP1 having the preset magnitude in step S22, and after that, ends the present routine. In the case where the rear wheel on the inner side with respect to the vehicle turning direction is the rear right wheel RR, for example, the ECU 16 supplies a current to the solenoids of the respective proportional electromagnetic valves 42, 44, 45, 50 and 54 in order to convert the proportional electromagnetic valves 42, 44, 45, 50 and 54 to a closed state. In addition, the ECU 16 supplies a current to the solenoid of the electromagnetic valve 53 in order to convert the electromagnetic valve 53 to an open state. Then, the ECU 16 drives the motor M in order to drive the first pump 38.

The ECU 16 measures the driving time of the motor M using a timer, not shown, within the ECU 16 and estimates the magnitude of the braking force BP applied to the rear wheel on the inner side with respect to the vehicle turning direction from the measured driving time. The ECU 16 assumes that the longer the driving time of the motor M is, the greater the magnitude of the braking force BP applied to the rear wheel on the inner side with respect to the vehicle turning direction is. In addition, in the case where the braking force BP applied to the rear wheel on the inner side with respect to the vehicle turning direction is increased to the normal braking force BP1, the ECU 16 calculates the driving time of the motor M which is required to increase the estimated current braking force BP to the normal braking force BP1, and drives the motor M for the calculated driving time.

Thus, the pressure of the brake fluid within the wheel cylinder corresponding to the rear wheel on the inner side with respect to the vehicle turning direction increases to the preset pressure of the brake fluid. That is to say, as shown in FIG. 6, the braking force BP provided to the rear wheel on the inner side with respect to the vehicle turning direction increases to the level of the normal braking force BP1. In FIG. 6, for example, the braking force BP applied to the rear wheel on the inner side with respect to the vehicle turning direction increases as the motor M is driven from time T10 when the motor M starts being driven to time T11. Thus, when the braking force BP reaches the normal braking force BP1 at time T11, the motor M is stopped being driven, and at the same time, the proportional electromagnetic valve corresponding to the rear wheel on the inner side with respect to the vehicle turning direction (for example, proportional electromagnetic valve 43 in the case of the rear right wheel RR) is converted to a closed state. As a result, the braking force BP applied to the rear wheel on the inner side with respect to the vehicle turning direction is maintained at the normal braking force BP1.

Meanwhile, in the case where the result of the determination in step S21 of FIG. 4 is an affirmative determination (absolute value of VS<KVS2), the ECU 16 cancels the application of the braking force BP to the rear wheel on the inner side with respect to the vehicle turning direction in step S23, and after that, ends the present routine. That is to say, the ECU 16 reduces the braking force BP applied to the rear wheel on the inner side with respect to the vehicle turning direction to a magnitude smaller than the braking force which is applied in the case where the absolute value of the vehicle body speed VS is equal to or greater than the second speed threshold value KVS2. In the case where the rear wheel on the inner side with respect to the vehicle turning direction is the rear right wheel RR, for example, the ECU 16 supplies a current to the solenoid of the electromagnetic valve 47 in order to convert the electromagnetic valve 47 to an open state during a preset and predetermined time and stops the supply of the current to the solenoid of the electromagnetic valve 47 after the predetermined time has elapsed. The above described predetermined time is a time required to sufficiently reduce the pressure of the brake fluid within the wheel cylinder and is set through experiments, simulations or the like.

In a vehicle in which the conventional brake control apparatus is mounted, as shown in FIG. 5, the braking force BP applied to the rear wheel on the inner side with respect to the vehicle turning direction is not cancelled even when the vehicle body speed VS is less than the second speed threshold value KVS2 (that is to say, even when the vehicle stops). Therefore, the vehicle does not start moving unless the driver depresses the accelerator pedal 17 relatively deeply. In addition, even when the vehicle starts moving, the driver feels sluggishness, and noise is made in the vicinity of the rear wheel on the inner side with respect to the vehicle turning direction as described in the Background of the Invention section.

According to the present embodiment, however, as shown in FIG. 6, in the case where the vehicle body speed VS is less than the second speed threshold value KVS2, the braking force BP applied to the rear wheel on the inner side with respect to the vehicle turning direction is reduced to zero from the normal braking force BP1. At time T12, for example, when the vehicle body speed VS is less than the second speed threshold value KVS2, the braking force BP applied to the rear wheel on the inner side with respect to the vehicle turning direction is canceled. Therefore, the vehicle may move due to a creep phenomenon. Accordingly, the driver does not feel sluggishness when the accelerator pedal is depressed and the vehicle starts moving. In addition, the vehicle can be prevented from starting to move in a state where the braking force BP is applied to the rear wheel on the inner side with respect to the vehicle turning direction, and therefore, no noise is made in the vicinity of the rear wheel on the inner side with respect to the vehicle turning direction when the vehicle starts moving.

When the vehicle body speed VS becomes equal to or greater than the second speed threshold value KVS2 at time T13, the braking force BP applied to the rear wheel on the inner side with respect to the vehicle turning direction becomes great in comparison with the case where the vehicle body speed VS is less than the second speed threshold value KVS2. That is to say, in the case where the vehicle body speed VS becomes less than the second speed threshold value KVS2 between time T12 and time T14, the braking force BP applied to the rear wheel on the inner side with respect to the vehicle turning direction becomes zero. Meanwhile, in the case where the vehicle body speed VS becomes equal to or greater than the second speed threshold value KVS2, the braking force BP applied to the rear wheel on the inner side with respect to the vehicle turning direction becomes great within a range not exceeding the normal braking force BP1.

In the case where the accelerator pedal 17 is further depressed at time T14, the vehicle body speed VS increases, and at the same time, the braking force BP applied to the rear wheel on the inner side with respect to the vehicle turning direction increases. After that, when the braking force BP reaches the normal braking force BP1 at time T15, the motor M is stopped from being driven, and thus, the increase in the braking force BP stops.

That is to say, in the case where the vehicle body speed VS is greater than the second speed threshold value KVS2 and smaller than the first speed threshold value KVS1, the braking force BP applied to the rear wheel on the inner side with respect to the vehicle turning direction is maintained at the normal braking force BP1. Therefore, it becomes possible to make the turning radius of the vehicle small in comparison with the case of vehicles where no brake control during turning is carried out. After that, in the case where the absolute value of the steering angle A of the steering wheel 24 is less than the steering angle threshold value KA, it is determined that the turning of the vehicle is completed and the brake control during turning is stopped. That is to say, the application of the braking force BP to the rear wheel on the inner side with respect to the vehicle turning direction is cancelled.

Accordingly, the present embodiment has the following advantages.

(1) In the case where the results of the determinations in steps S10, S12, S14 and S15 are all affirmative, the brake control during turning for applying the braking force BP to the rear wheel on the inner side with respect to the vehicle turning direction is carried out. In the case where the absolute value of the vehicle body speed VS is less than the second speed threshold value KVS2 while the brake control during turning is being carried out, the braking force BP applied to the rear wheel on the inner side with respect to the vehicle turning direction is set to a value smaller than that in the case where the absolute value of the vehicle body speed VS is equal to or greater than the second speed threshold value KVS2 (concretely, the braking force BP is set to zero). Therefore, even in the case where the vehicle stops while the brake control during turning is being carried out, sluggishness that the driver may feel is reduced and the noise made in the vicinity of the rear wheel on the inner side with respect to the vehicle turning direction is suppressed when the vehicle starts moving afterwards. Accordingly, in the case where the brake control during turning is carried out on the vehicle in a stopped state, discomfort felt by the driver can be reduced when the vehicle starts moving.

(2) In the case where the vehicle body speed VS is equal to or greater than the second speed threshold value KVS2, the magnitude of the braking force BP that has been set (normal braking force BP1) is applied to the rear wheel on the inner side with respect to the vehicle turning direction, and therefore, the turning radius of the vehicle can be reduced by carrying out the brake control during turning.

(3) In the case where the vehicle is in a stopped state, no braking force BP is applied to the rear wheel on the inner side with respect to the vehicle turning direction even while the brake control during turning is being carried out. Therefore, when the vehicle starts moving, sluggishness is prevented from being felt by the driver, and at the same time, noise is prevented from being made in the vicinity of the rear wheel on the inner side with respect to the vehicle turning direction.

Figure 7:
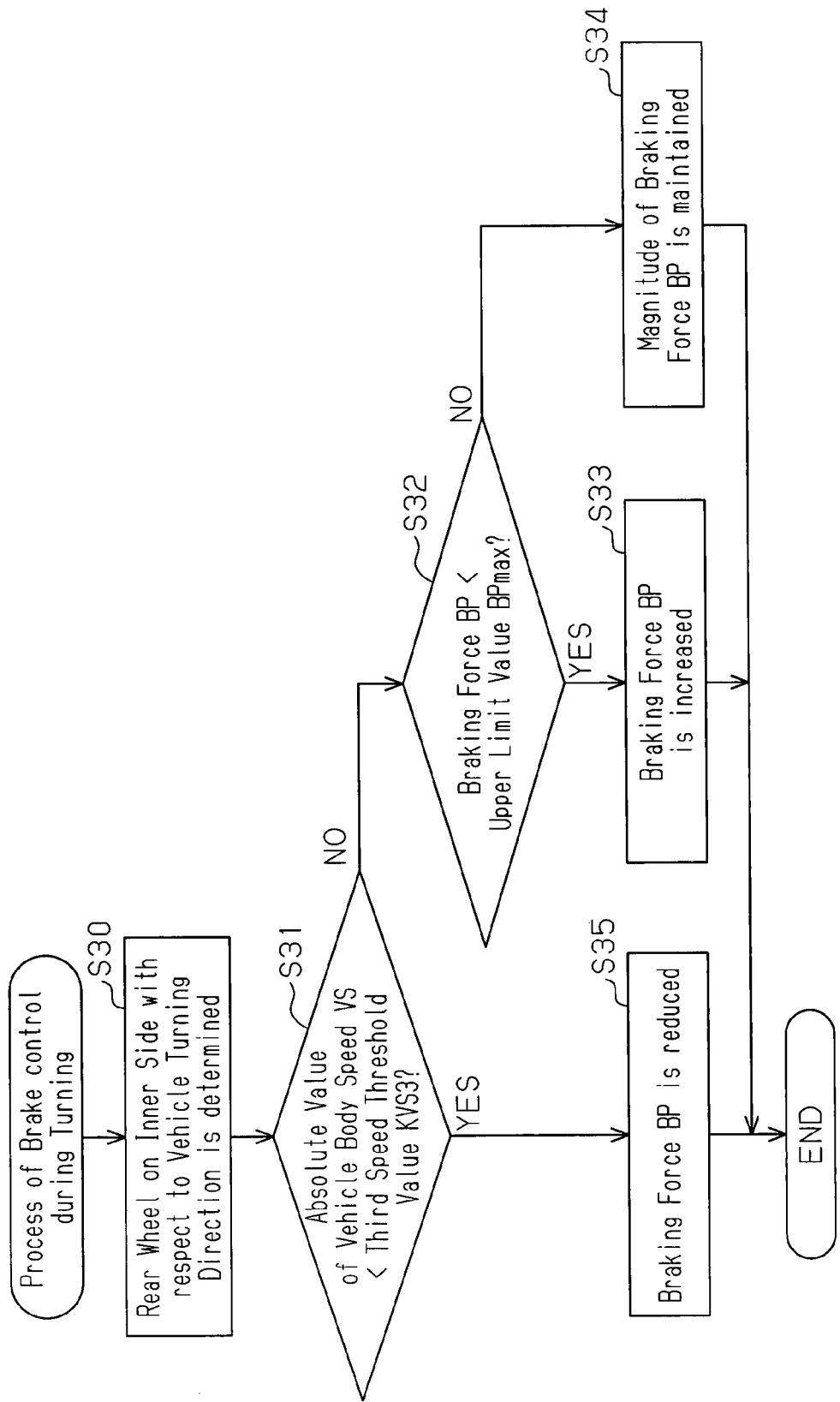
FIG. 7 is a flowchart showing a process routine of brake control during turning according to a second embodiment of the present invention.

Next, a second embodiment of the present invention is described in reference to FIGS. 7 and 8. In the second embodiment, the content of the brake control during turning is different from the brake control during turning according to the first embodiment. Accordingly, in the following, portions which are different from those in the first embodiment are mainly described, and the same symbols are attached to the members that are the same or correspond to those in the first embodiment, and the same descriptions are omitted.

In the present embodiment, the routine of FIG. 7 is carried out instead of the routine of FIG. 4. That is to say, in step S30, the ECU 16 determines which of the two rear wheels RR and RL is on the inner side with respect to the vehicle turning direction. Subsequently, in step S31, the ECU 16 determines whether the absolute value of the vehicle body speed VS obtained in step S11 of FIG. 2 is less than the third speed threshold value KVS3, which has been set to a value smaller than that of the first speed threshold value KVS1. The third speed threshold value KVS3 is set through experiments, simulations or the like as a value with which the effects can be appropriately gained by carrying out the brake control during turning. The third speed threshold value KVS3 is set at a value which is smaller than the vehicle body speed in the case where the vehicle runs due to a creep phenomenon and greater than the second speed threshold value KVS2 in the case of the first embodiment, and for example, 2 km per hour.

In the case where the result of the determination in step S31 is negative (absolute value of VS≧KVS3), the ECU 16 determines whether the braking force BP applied to the rear wheel on the inner side with respect to the vehicle turning direction is less than the preset upper limit value BPmax in step S32. That is so say, the ECU 16 reads out the braking force BP estimated from the driving time of the motor M and determines whether the estimated braking force BP is less than the upper limit value BPmax. The upper limit value BPmax is an upper limit value of the braking force BP applied to the rear wheel on the inner side with respect to the vehicle turning direction when the brake control during turning is being carried out and is preset through experiments, simulations or the like.

In the case where the result of the determination in step S32 is affirmative (BP<BPmax), the ECU 16 makes the braking force BP applied to the rear wheel on the inner side with respect to the vehicle turning direction greater than the braking force currently applied to the rear wheel in step S33. In the case where the rear wheel on the inner side with respect to the vehicle turning direction is the rear right wheel RR, for example, the ECU 16 converts the proportional electromagnetic valves 42, 44, 45, 50 and 54 to a closed state, and at the same time, converts the electromagnetic valve 53 to an open state. Furthermore, the ECU 16 drives the motor M in order to drive the first pump 38. After that, the ECU 16 ends the present routine. Thus, the pressure of the brake fluid within the wheel cylinder corresponding to the rear wheel on the inner side with respect to the vehicle turning direction increases. That is to say, as shown in FIG. 8, the braking force BP applied to the rear wheel on the inner side with respect to the vehicle turning direction gradually increases as time elapses.

Meanwhile, in the case where the result of the determination in step S32 is negative (BP≧BPmax), the ECU 16 maintains the braking force BP applied to the rear wheel on the inner side with respect to the vehicle turning direction at the upper limit value BPmax in step S34. In the case where the rear wheel on the inner side with respect to the vehicle turning direction is the rear right wheel RR, for example, the ECU 16 converts the proportional electromagnetic valve 43 to a closed state, and at the same time, stops the motor M from being driven. After that, the ECU 16 ends the present routine.

That is to say, as shown in FIG. 8, when the depressed amount of the accelerator pedal 17 increases between time T20 and time T21, for example, the value of the vehicle body speed VS increases in accordance with the depressed amount. Thus, the braking force BP applied to the rear wheel on the inner side with respect to the vehicle turning direction increases in order to maintain the vehicle body speed VS at the third speed threshold value KVS3. In addition, as the braking force BP applied to the rear wheel on the inner side with respect to the vehicle turning direction increases as time elapses between time T21 and time T22, the vehicle body speed VS becomes slow and the vehicle body speed VS becomes substantially the same as the third speed threshold value KVS3. After that, the magnitude of the braking force BP applied to the rear wheel on the inner side with respect to the vehicle turning direction is adjusted such that the vehicle body speed VS is maintained at the third speed threshold value KVS3 between time T22 and time T23.

In the case where, for example, the depressed amount of the accelerator pedal 17 further increases between time T22 and time T23, however, the braking force BP applied to the rear wheel on the inner side with respect to the vehicle turning direction further increases. In addition, in the case where it is determined that the braking force BP applied to the rear wheel on the inner side with respect to the vehicle turning direction at time T24 becomes a value of equal to or greater than the upper limit value BPmax, for example, the braking force BP is maintained at the current braking force, that is to say, the upper limit value BPmax.

Meanwhile in the case where the result of the determination in step S31 is affirmative (absolute value of VS<KVS3), the ECU 16 makes the braking force BP applied to the rear wheel on the inner side with respect to the vehicle turning direction smaller than the braking force currently applied to the rear wheel in step S35. In the case where the rear wheel on the inner side with respect to the vehicle turning direction is the rear right wheel RR, for example, the ECU 16 converts the proportional electromagnetic valve 43 to a closed state, and at the same time, converts the electromagnetic valve 47 to an open state, and furthermore, stops the motor M from being driven. After that, the ECU 16 ends the present routine.

As shown in FIG. 8, for example, when the depressed amount of the accelerator pedal 17 decreases between time T25 and time T26, the vehicle body speed VS gradually decreases. In addition, in the case where the vehicle body speed VS becomes lower than the third speed threshold value KVS3 at time T27, for example, the braking force BP applied to the rear wheel on the inner side with respect to the vehicle turning direction becomes smaller than the upper limit value BPmax in order to maintain the vehicle body speed VS at the third speed threshold value KVS3. As a result, when the vehicle body speed VS increases and the vehicle body speed VS again becomes equal to or greater than the third speed threshold value KVS3 at time T28, for example, the braking force BP applied to the rear wheel on the inner side with respect to the vehicle turning direction increases as time elapses.

In addition, when the vehicle body speed VS becomes substantially equal to the third speed threshold value KVS3 at time T29, for example, the magnitude of the braking force BP applied to the rear wheel on the inner side with respect to the vehicle turning direction is adjusted such that the vehicle body speed VS is maintained at the third speed threshold value KVS3.

That is to say, according to the present embodiment, the magnitude of the braking force BP applied to the rear wheel on the inner side with respect to the vehicle turning direction is adjusted, and thus, the vehicle turns at a vehicle body speed VS which is substantially the same as the third speed threshold value KVS3. Therefore, the vehicle is prevented from stopping while the brake control during turning is being carried out.

Accordingly, the present embodiment obtains the following advantages in addition to the advantage (1) of the above described first embodiment.

(4) When the rotational speed of the rear wheel on the inner side with respect to the vehicle turning direction becomes zero during the brake control during turning, theoretically, the vehicle turns with the minimum radius around the rear wheel. In reality, however, when the vehicle turns in a state where the rotational speed of the rear wheel on the inner side with respect to the vehicle turning direction is zero, the load applied to the rear wheel increases. Therefore, it is desirable for the wheel speed of the rear wheel on the inner side with respect to the vehicle turning direction to be decreased smoothly to a value near zero. Therefore, according to the present embodiment, during the period when the vehicle body speed VS is equal to or greater than the third speed threshold value KVS3 while the brake control during turning is being carried out, the braking force BP applied to the rear wheel on the inner side with respect to the vehicle turning direction is increased as time elapses. Therefore, the rotational speed of the rear wheel on the inner side with respect to the vehicle turning direction can be rapidly slowed as compared with the case where a constant braking force is applied to the rear wheel on the inner side with respect to the vehicle turning direction, and therefore, the turning radius of the vehicle is reliably made small.

(5) In addition, according to the present embodiment, the braking force BP applied to the rear wheel on the inner side with respect to the vehicle turning direction is adjusted such that the vehicle body speed VS is maintained at the third speed threshold value KVS3. As a result, the vehicle is prevented from stopping while the brake control during turning is being carried out, and consequently, sluggishness is prevented from being felt by the driver and noise is effectively prevented from being made in the vicinity of the rear wheel on the inner side with respect to the vehicle turning direction.

(6) In the case where it is necessary to apply the braking force BP of equal to or greater than the upper limit value BPmax to the rear wheel on the inner side with respect to the vehicle turning direction, it can be generally estimated that the vehicle body speed VS is relatively high. In this case, even when the brake control during turning is not carried out, a braking force is applied to each of the wheels FR, FL, RR and RL through the operation of the driver on the brake pedal 37, and therefore, the turning radius of the vehicle is reduced. Consequently, a braking force BP of equal to or greater than the upper limit value BPmax is prevented from being applied to the rear wheel on the inner side with respect to the vehicle turning direction while the brake control during turning is being carried out. As a result, parts (wheel cylinder 36c, brake pads and the like) for applying a braking force BP to the rear wheel on the inner side with respect to the vehicle turning direction are prevented from being worn.

The respective embodiments may be modified as follows.

In the respective embodiments, the braking force BP applied to the rear wheel on the inner side with respect to the vehicle turning direction when the vehicle is in a stopped state may be an arbitrary magnitude as long as it is smaller than the braking force applied to the rear wheel on the inner side with respect to the vehicle turning direction when the vehicle body speed VS is equal to or greater than the second speed threshold value KVS2 or the third speed threshold value KVS3.

It is not necessary for the upper limit value BPmax to be provided in the second embodiment. In this case, when the vehicle body speed VS is equal to or greater than the third speed threshold value KVS3 while the brake control during turning is being carried out, the braking force BP applied to the rear wheel on the inner side with respect to the vehicle turning direction keeps increasing as time elapses until the pressure of the brake fluid within the wheel cylinder becomes the maximum allowable value for the wheel cylinder.

In each of the embodiments, a hydraulic sensor for detecting the pressure of the brake fluid may be provided for each wheel cylinder 36a to 36d in order to individually obtain the braking force applied to each of the wheels FR, FL, RR and RL. In such a configuration, the braking force BP applied to the rear wheel on the inner side with respect to the vehicle turning direction can be appropriately obtained while the brake control during turning is being carried out.

In each of the embodiments, it is not necessary to carry out the determination process of step S12 in the routine of FIG. 3. That is to say, in the case where all the determination processes of steps S10, S14 and S15 are affirmative, the brake control during turning may be carried out irrelevant of the vehicle body speed VS.

In addition, it is not necessary to carry out the determination process of step S10 in the routine of FIG. 3. That is to say, in the case where all the determination processes of steps S12, S14 and S15 are affirmative, the brake control during turning may be carried out irrelevant of the operation of depressing the brake pedal 37.

Furthermore, it is not necessary to carry out the determination process of step S15 in the routine of FIG. 3. That is to say, in the case where all the determination processes of steps S10, S12 and S14 are affirmative, the brake control during turning may be carried out irrelevant of the operation state of the operation switch SW2 (whether it is ON or OFF).

In each of the embodiments, it is not necessary to provide the operation switch SW2. In this case, the steering torque applied to the steering wheel 24 is obtained on the basis of the signal from the steering torque sensor SE3 in step S15 of FIG. 3, and it is preferable to carry out step S16 of FIG. 3 when the steering torque is equal to or greater than a preset steering torque threshold value.

In each of the embodiments, a braking force may also be provided to the front wheel on the inner side with respect to the vehicle turning direction when the brake control during turning is carried out. In addition, a braking force may be provided only to the front wheel on the inner side with respect to the vehicle turning direction without applying a braking force to the rear wheel on the inner side with respect to the vehicle turning direction.

In each of the embodiments, the steering angle threshold value KA may be a value smaller than the maximum steering angle.

In each of the embodiments, the vehicle body speed VS may be obtained in reference to the highest value, the second highest value, the third highest value or the average value of the rotational speeds of the wheels FR, FL, RR and RL.

In addition, the vehicle body speed VS may be obtained from the information detected by a vehicle body speed sensor or a GPS (global positioning system) instead of being obtained from the rotational speeds of the wheels FR, FL, RR and RL.

In each of the embodiments, the present invention may be applied to a brake control apparatus mounted in a rear-wheel-drive vehicle or a four-wheel-drive vehicle instead of the brake control apparatus 11 mounted in a front-wheel-drive vehicle.

In each of the embodiments, the wheel cylinder 36a for the front right wheel FR and the wheel cylinder 36b for the front left wheel FL may be connected to the first hydraulic pressure circuit 33, and the wheel cylinder 36c for the rear right wheel RR and the wheel cylinder 36d for the rear left wheel RL may be connected to the second hydraulic pressure circuit 34.

In each of the embodiments, the braking force applying mechanism 15 may be of a brake-by-wire system which converts the amount by which the driver depresses the brake pedal 37 into an electrical signal and provides the braking force on the basis of the electrical signal to each of the wheels FR, FL, RR and RL.

In each of the above described embodiments, a braking force is applied to a wheel on the inner side with respect to the vehicle turning direction, and no braking force is applied to the wheels on the outer side with respect to the vehicle turning direction while the brake control during turning is being carried out. That is to say, the braking force applied to the wheels on the outer side with respect to the vehicle turning direction is zero while the braking force applied to the wheels on the inner side with respect to the vehicle turning direction is greater than zero. However, a braking force which is greater than zero may be applied to the wheel on the outer side with respect to the vehicle turning direction while the brake control during turning is being carried out. In this case, the same results as those of the brake control during turning in each of the above described embodiments are obtained when the braking force applied to the wheel on the inner side with respect to the vehicle turning direction is greater than the braking force applied to the wheels on the outer side with respect to the vehicle turning direction.

The present examples and embodiments are to be considered as illustrative and not restrictive and the invention is not to be limited to the details given herein, but may be modified within the scope and equivalence of the appended claims.

What is claimed is:

1. A brake control apparatus, which is used in a vehicle having wheels on left and right sides, and controls a braking force provided to each of the wheels, comprising:
    a vehicle body speed calculating section for obtaining a vehicle body speed of the vehicle;
    a steering angle calculating section for obtaining a steering angle of a steering wheel of the vehicle; and
    a control section for carrying out brake control during turning, wherein the brake control during turning is executed in order to provide a braking force to a wheel on the inner side with respect to a vehicle turning direction in the case where the absolute value of the steering angle is equal to or greater than a preset threshold value of the steering angle,
    wherein, in the case where the vehicle body speed is less than a preset speed threshold value, the control section carries out the brake control during turning such that the braking force provided to the wheel on the inner side with respect to the vehicle turning direction is smaller than the braking force in the case where the vehicle body speed is equal to or greater than the speed threshold value.

2. The apparatus according to claim 1, wherein the control section carries out the brake control during turning such that a braking force which is zero or greater than zero is provided to a wheel on the outer side with respect to the vehicle turning direction, and that a braking force which is greater than the braking force provided to the wheel on the outer side with respect to the vehicle turning direction is provided to a wheel on the inner side with respect to the vehicle turning direction.

3. The apparatus according to claim 1, wherein, in the case where the vehicle body speed is equal to or greater than the speed threshold value, the control section carries out the brake control during turning such that a braking force of a preset magnitude is provided to the wheel on the inner side with respect to the vehicle turning direction.

4. The apparatus according to claim 3, wherein, in the case where the vehicle body speed is less than the speed threshold value, the control section carries out the brake control during turning such that the braking force provided to the wheel on the inner side with respect to the vehicle turning direction is cancelled.

5. The apparatus according to claim 1, wherein, as long as the vehicle body speed is equal to or greater than the speed threshold value, the control section carries out the brake control during turning such that the braking force provided to the wheel on the inner side with respect to the vehicle turning direction becomes greater as time elapses.

6. The apparatus according to claim 5, wherein the braking force has an upper limit value.

7. The apparatus according to claim 6, wherein, the control section increases the braking force to the upper limit value and after that, the control section maintains the braking force at the upper limit value as long as the vehicle body speed is equal to or greater than the speed threshold value.

8. The apparatus according to claim 1, wherein, in the case where the vehicle comes to a stopped state, the control section carries out the brake control during turning such that the braking force provided to the wheel on the inner side with respect to the vehicle turning direction is canceled.

9. A brake control method which is used in a vehicle having wheels on left and right sides, and controls a braking force provided to each of the wheels, the method comprising:
 obtaining a vehicle body speed of the vehicle;
 obtaining a steering angle of a steering wheel of the vehicle; and
 carrying out brake control during turning, wherein the brake control during turning is executed in order to provide a braking force to a wheel on the inner side with respect to the vehicle turning direction in the case where the absolute value of the steering angle is equal to or greater than a preset threshold value of the steering angle,
 wherein, in the case where the vehicle body speed is less than a preset speed threshold value when the brake control during turning is carried out, the braking force provided to the wheel on the inner side with respect to the vehicle turning direction is made smaller than the braking force in the case where the vehicle body speed is equal to or greater than the speed threshold value.

10. The method according to claim 9, wherein, when the brake control during turning is carried out, a braking force which is zero or greater than zero is provided to a wheel on the outer side with respect to the vehicle turning direction, and a braking force which is greater than the braking force provided to the wheel on the outer side with respect to the vehicle turning direction is provided to a wheel on the inner side with respect to the vehicle turning direction.

\* \* \* \* \*